US012655697B2

(12) United States Patent
Wagle et al.

(10) Patent No.: US 12,655,697 B2
(45) Date of Patent: Jun. 16, 2026

(54) LOST CIRCULATION MATERIAL COMPOSITIONS UTILIZING SPENT DRILLING FLUIDS AND METHODS FOR USING THE SAME

(71) Applicant: Saudi Arabian Oil Company, Dhahran (SA)

(72) Inventors: Vikrant Wagle, Dhahran (SA); Rajendra Kalgaonkar, Dhahran (SA); Abdullah Al-Yami, Dhahran (SA); Mohammad Alharthi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/620,031

(22) Filed: Mar. 28, 2024

(65) Prior Publication Data

US 2025/0305377 A1    Oct. 2, 2025

(51) Int. Cl.
E21B 21/00    (2006.01)
C09K 8/50    (2006.01)
E21B 33/138    (2006.01)

(52) U.S. Cl.
CPC .............. *E21B 21/003* (2013.01); *C09K 8/50* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 11,124,691 B2 | 9/2021 | Wagle et al. | |
| 2019/0161668 A1* | 5/2019 | Wagle | C09K 8/5086 |
| 2020/0332174 A1* | 10/2020 | Wagle | C09K 8/5045 |

* cited by examiner

*Primary Examiner* — Andrew Sue-Ako
(74) *Attorney, Agent, or Firm* — Dinsmore & Shohl, LLP

(57) ABSTRACT

A lost circulation material (LCM) composition comprising a spent drilling fluid and a chemical activator. The spent drilling fluid may comprise an aqueous solution, contaminants comprising heavy metals, salt, or both, and an alkaline nanosilica dispersion. The chemical activator may comprise a water soluble hydrolysable polyester. The spent drilling fluid may also have a pH and a gel pH, wherein the pH of the spent drilling fluid is greater than the gel pH.

20 Claims, 2 Drawing Sheets

LOST CIRCULATION MATERIAL COMPOSITIONS UTILIZING SPENT DRILLING FLUIDS AND METHODS FOR USING THE SAME

TECHNICAL FIELD

Embodiments of the present disclosure generally relate to compositions and methods for lost circulation control in a subterranean formation.

BACKGROUND

Fluids used in drilling a wellbore can be lost to the surrounding subterranean formation while circulating in the wellbore. The drilling fluid can enter the subterranean formation via depleted zones, zones of relatively lower pressure, lost circulation zones having naturally occurring fractures, weak zones having fracture gradients exceeded by the hydrostatic pressure of the drilling fluid, and other openings between the wellbore and the subterranean formation. The extent of fluid loss to the subterranean formation can be substantial, including greater than 100 barrels per hour (bbl/hr).

SUMMARY

Accordingly, there is a continual need for lost circulation materials (LCMs) and compositions for the same that can plug these lost circulation zones and allow drilling to continue without substantial loss of drilling fluid. Additionally, with increasing environmental scrutiny being paid to drilling operations, many resources are being applied to methods of utilizing waste products in positive applications, rather than disposing of the same. Spent drilling fluids are one such waste product.

Particularly, in the course of drilling, drilling fluids are exposed to high concentrations of contaminants such as heavy metals and salts that are present in the surrounding subterranean environment. Accordingly, a portion of these contaminants may be gathered in the drilling fluid itself, negatively impacting the properties of the drilling fluid or damaging drilling equipment. Further, the presence of these contaminants renders the drilling fluid into a special waste, the disposal of which falls under various strict regulatory acts depending on the country, with the United States including the Resource Conservation and Recovery Act (RCRA), the Clean Water Act (CWA) and the Toxic Substance Control Act (TSCA). Thus, the removal of these contaminants and heavy metals often must be completed before the contaminants and drilling fluid can be disposed of in a landfill and water source, respectively, adding substantial cost and risk.

Accordingly, methods are desired in which the spent drilling fluid may still be used in a constructive manner, and particularly in a manner that does not require the later treatment of the same for disposal. Disclosed herein are embodiments that accomplish the aforementioned goals, in that a spent drilling fluid may be used as a LCM composition in drilling operations, providing a constructive use for a fluid that is otherwise environmental waste. Further, the placement of the spent drilling fluid as a solid gel within the lost circulation zones permits the sequestration of the spent drilling fluid, as well as contaminants within the same, in a manner that does not require costly treatment.

Particularly, a chemical activator comprising a water soluble hydrolysable polyester may be introduced to the spent drilling fluid, whereupon the polyester hydrolyzes into an acid and reduces a pH of the spent drilling fluid. When the pH falls below a gel pH threshold, nanosilica in the spent drilling fluid agglomerates, transforming the spent drilling fluid into a solid gel LCM composition. This LCM composition may then be injected into a lost circulation zone in the wellbore, plugging the lost circulation zone and allowing drilling to continue without additional drilling fluid loss. Additionally, in subsequent casing and completion operations, the LCM composition may be sequestered in the lost circulation zone by cementing a portion of the wellbore overlapping with the lost circulation zone. Further, the presence of contaminants such as salt or heavy metals in the spent drilling fluid as opposed to a 'fresh' drilling fluid may benefit the formation of the LCM composition, potentially requiring less of the water soluble hydrolysable polyester to be introduced to the spent drilling fluid to induce gelling in the same.

In accordance with one embodiment herein, a lost circulation material (LCM) composition may comprise a spent drilling fluid and a chemical activator. The spent drilling fluid may comprise an aqueous solution, contaminants comprising heavy metals, salt, or both, and an alkaline nanosilica dispersion. The chemical activator may comprise a water soluble hydrolysable polyester. Further, the spent drilling fluid may have a pH and a gel pH, wherein the pH of the spent drilling fluid is greater than the gel pH.

In accordance with another embodiment herein, a method for controlling lost circulation may comprise: introducing a spent drilling fluid comprising an aqueous solution, contaminants comprising salt, heavy metals, or both, and an alkaline nanosilica dispersion into a wellbore; introducing a chemical activator to the spent drilling fluid, the chemical activator comprising a water soluble hydrolysable polyester; allowing the chemical activator to hydrolyze and produce an acid, reducing a pH of the spent drilling fluid to less than a gel pH and converting the spent drilling fluid into a lost circulation material (LCM) composition.

Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE DRAWINGS

The following detailed description of specific embodiments herein can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
FIG. 1 illustrates a lost circulation material composition in a gelled state, according to one or more embodiments described herein.

As used herein, the term "downhole" refers to a direction further into the formation and away from the surface. For example, a first component that is downhole relative to a second component is positioned farther away from the surface of the wellbore relative to the second component.

As used herein, the term "hydrolysis" or "hydrolyze" refers to a chemical reaction where water reacts with another compound to produce an acid. "Hydrolysis time" or "rate of hydrolysis" refers to the amount of time required to reduce a pH of the spent drilling fluid from a starting pH to a gel pH of the spent drilling fluid, i.e., the pH at which a solid or semi-solid LCM composition forms.

As used herein, the term "lost circulation zone" refers to an area encountered during drilling operations where the volume of drilling fluid returning to the surface is less than the volume of drilling fluid introduced/injected into the wellbore. The lost circulation zone may be due to any kind of opening between the wellbore and surrounding subterranean formation or formations. Lost circulation zones that may be addressed by the lost circulation material compositions herein may range from seepage drilling fluid loss to complete drilling fluid loss.

As used herein, the term "stable" refers to the state wherein the nanosilica particles are dispersed through the alkaline nanosilica dispersion and are not aggregrated/flocculated/coagulated. Upon "destabilization", the nanosilica particles may aggregate to form a gelled solid.

As used herein, the terms "subsurface formation", "subterranean formation" or just "formation" may be used interchangeably and may each refer to a subterranean/subsurface geologic region.

As previously stated, embodiments herein relate to lost circulation material (LCM) compositions and methods for controlling loss circulation in a subterranean formation, such as by using the former. A well may be drilled with a drilling fluid allowing for continued drilling upon encountering a lost circulation zone by converting a spent drilling fluid into a LCM composition for plugging the lost circulation zone. Specifically, the LCM composition described in embodiments herein may comprise a spent drilling fluid and a chemical activator. The spent drilling fluid may itself comprise an aqueous solution, an alkaline nanosilica dispersion, contaminants, and optionally one or more additives. The spent drilling fluid may itself be converted to a solid gel upon a pH reduction, such as by the chemical activator. The solid gel LCM composition formed may then serve to prevent further fluid loss at the lost circulation zone by acting as a physical barrier when it is injected into the same.

As previously stated, the spent drilling fluid may comprise an aqueous solution. The aqueous solution may comprise one or more of freshwater, municipal water, well water, distilled water, deionized water, or combinations of these.

As previously stated, the spent drilling fluid may also comprise contaminants. The contaminants may comprise salts, heavy metals, or combinations thereof. In embodiments, the contaminants, such as salts and heavy metals, may be present in or incorporated into the aqueous solution. The salts may include, but may not be limited to, alkali metals, chlorides, sulfates, and carboxylates. In embodiments, salts present in the aqueous solution may also include ions such as, not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations thereof.

The heavy metals may comprise chromium, manganese, iron, cobalt, nickel, copper, zinc, arsenic, cadmium, barium, mercury, lead, thorium, uranium, or combinations thereof. Without being limited by theory, the salts and heavy metals may be considered contaminants due to the negative impacts the same have on rheological and filtration properties of a drilling fluid, such as potentially prematurely gelling the drilling fluid or impacting the solubility of other desired additives.

As previously stated, the spent drilling fluid may comprise an alkaline nanosilica dispersion. In embodiments, the alkaline nanosilica dispersion may represent a dispersion of nanosilica particles in a dispersion fluid in combination with an alkali, such as NaOH, in order to stabilize the dispersion. It will be appreciated that salts such as, but not limited to NaCl and KCl, may be avoided in the alkaline nanosilica dispersion when it is in use as a drilling fluid. The surface charge of the nanosilica particles may be neutralized by soluble salts that ionize and reduce the size of a double layer around the silica surface, which allows for aggregation, and thus renders the drilling fluid 'spent'. As such, maintenance of a minimized salt concentration may be sought in the drilling fluid to ensure retention of the dispersion and not form a spent drilling fluid.

However, in some situations the accumulation of these salts may not be preventable. Particularly, as previously discussed, in the course of drilling operations the drilling fluids may be exposed to high concentrations of heavy metals and salts present in the surrounding subterranean environment. A portion of these contaminants may be gathered in the drilling fluid itself, thus forming a spent drilling fluid.

In embodiments, the drilling fluid may become spent when a salinity or total dissolved solids (TDS) content of the same reaches greater than or equal to 250,000 ppm, such as from 250,000 ppm to 300,000 ppm, from 300,000 ppm to 500,000 ppm, from 500,000 ppm to 1,000,000 ppm, or combinations of the previous ranges or smaller ranges therein, such as from 250,000 ppm to 1,000,000 ppm. In other words, the spent drilling fluid may comprise greater than or equal to 250,000 ppm salts, or any of the previous ppm ranges salts. Additionally or alternatively, the drilling fluid may become spent when a total heavy metals content of the same reaches greater than or equal 0.001 ppm, such as from 0.001 ppm to 0.005 ppm, from 0.005 ppm to 0.01 ppm, from 0.01 ppm to 0.05 ppm, from 0.05 ppm to 1 ppm, from 1 ppm to 1.5 ppm, from 1.5 ppm to 10 ppm, from 10 ppm to 100 ppm, or any combination of the previous ranges or smaller range therein, such as from 0.001 ppm to 100 ppm. In other words, the spent drilling fluid may comprise greater than or equal to 0.001 ppm heavy metals, or any of the previous ppm ranges heavy metals. Without being limited by theory, the point of heavy metals content at which the drilling fluid becomes spent may depend on the heavy metal(s) measured. Particularly, as previously stated, the heavy metals may comprise chromium, manganese, iron, cobalt, nickel, copper, zinc, arsenic, cadmium, barium, mercury, lead, thorium, uranium, or combinations thereof. Accordingly, the spent point may be lower for more toxic heavy metals, such as arsenic, mercury, or lead, than for metals such as copper or iron.

In one or more embodiments, the nanosilica particles in the alkaline nanosilica dispersion may have a particle size between 5 nanometers (nm) and 100 nm. In various further embodiments, the nanosilica particles in the alkaline nanosilica dispersion may have a particle size of between 5 nm and 80 nm, between 20 nm and 80 nm, between 30 nm and 60 nm, or between 40 nm and 50 nm. It will be appreciated that a smaller particle size results in a relatively faster gelling of the spent drilling fluid when all other parameters are held constant.

The nanosilica particles may have a greater surface area than silica particles as a result of the smaller particle size. Without being bound to a particular theory, the greater surface area of the nanosilica particles can affect the rate of gelation and the nature of the gels formed. More specifically, the smaller particle size of the nanosilica particles in the alkaline nanosilica dispersion promotes faster gelling than silica particles.

The concentration of the nanosilica particles in the alkaline nanosilica dispersion may range between 5 percent by weight (wt %) and 50 wt %. In one or more embodiments, the alkaline nanosilica dispersion may comprise 10 wt % to 50 wt % nanosilica particles, 20 wt % to 50 wt % nanosilica particles, 30 wt % to 50 wt % nanosilica particles, or 40 wt % to 50 wt % nanosilica particles. In one or more specific embodiments, the alkaline nanosilica dispersion may comprise 43 wt % to 47 wt % nanosilica particles. The concentration of nanosilica in the alkaline nanosilica dispersion may impact the rate of gel formation with a greater concentration of nanosilica in the alkaline nanosilica dispersion correlating to a faster rate of gel formation. The amount of the alkaline nanosilica dispersion added to the drilling fluid, and thus the spent drilling fluid may depend on the desired mud weight of the drilling fluid. It will be appreciated that an increase in the desired mud weight may necessitate a commensurate increase in nanosilica dispersion.

As previously stated, LCM composition may comprise a chemical activator. In embodiments, the chemical activator may be operable to hydrolyze in the aqueous solution to produce an acid such that the pH of the spent drilling fluid is decreased and the alkaline nanosilica dispersion is destabilized. As previously stated, the destabilization may result in coagulation, flocculation, and aggregation of the nanosilica, resulting in a gelled solid.

The chemical activator can be any water soluble hydrolysable ester that undergoes hydrolysis. The water soluble hydrolysable ester may comprise a glycol ester, a polyethylene glycol ester, an alkyl ester, an ester of a carboxylic acid and an alcohol, and combinations thereof. In one or more embodiments, the chemical activator may comprise ethyl lactate, diethylene glycol diformate, ethyl acetate, ethyl formate, ethylene glycol diacetate, dietheylene glycol dilactate, and combinations thereof. In one or more specific embodiments, the chemical activator is ethyl lactate. The chemical activator may be in the form of powder, beads, aqueous suspension, fibers, and combinations thereof. Advantageously, the chemical activator is chemically neutral until undergoing hydrolysis, such as upon contacting the water in the aqueous based drilling fluid. As such, the chemically neutral chemical activator may be handled at the rig site without special precautions prior to implementation in the spent drilling fluid.

It will be appreciated that upon hydrolysis in an aqueous medium the chemical activator is converted to an acid. Ethyl lactate hydrolyzes in an aqueous medium to form lactic acid. Diethylene glycol diformate hydrolyzes in an aqueous medium to form formic acid. Ethyl acetate hydrolyzes in an aqueous medium to form acetic acid. Ethyl formate hydrolyzes in an aqueous medium to form formic acid. Ethylene glycol diacetate hydrolyzes in an aqueous medium to form acetic acid. Dietheylene glycol dilactate hydrolyzes in an aqueous medium to form lactic acid.

The generated acid from hydrolysis of the chemical activator destabilizes the alkaline nanosilica dispersion to produce a LCM composition. The LCM composition forms from network structures. The alkaline nanosilica dispersion may be stable at a pH between about 8 to about 12. The stability of the alkaline nanosilica dispersion is due to silica particle repulsion resulting from surface ionization in the alkaline solution. The electrical repulsion between the same charged particles stabilizes the dispersion. Disturbance of the charge balance by reducing the pH to less than the gel pH due to the addition of acid can cause the alkaline nanosilica dispersion to destabilize and aggregate, which results in the formation of the LCM composition.

Further, the presence of contaminants such as salt or heavy metals in the spent drilling fluid as opposed to a 'fresh' drilling fluid may benefit the formation of the LCM composition, potentially requiring less of the water soluble hydrolysable polyester to be introduced to the spent drilling fluid to induce gelling in the same.

The alkaline nanosilica dispersion within the spent drilling fluid may be selected to obtain a gel pH compatible with the downhole conditions of the lost circulation zone. Specifically, a nanosilica dispersion may be selected such that the spent drilling fluid may be conveyed to the lost circulation zone before the chemical activator and the downhole conditions result in reduction to less than the gel pH. In various embodiments, the gel pH may be less than 7, less than 6, or less than 5. It will be appreciated that a more basic gel pH correlates to an extended period for positioning the spent drilling fluid within the lost circulation zone before formation of the LCM composition as greater pH reduction must occur before gelling.

The ratio between the alkaline nanosilica dispersion and the chemical activator in the spent drilling fluid may be between 0.1 percent by volume (activator) of the total volume (nanosilica) (v/v %) to 10 v/v %. The weight ratio between the alkaline nanosilica dispersion and the chemical activator in the spent drilling fluid may alternatively be defined as between 1 to 0.001 and 1 to 0.25. The amount of chemical activator added to the alkaline nanosilica dispersion may be adjusted based on the change in pH required in the spent drilling fluid. A greater required pH change correlates to a greater v/v % or ratio of chemical activator added to the alkaline nanosilica dispersion to generate a greater volume of acid for pH adjustment.

The spent drilling fluid may generally have a pH between 8 and 11 when introduced to the wellbore. The starting pH of the spent drilling fluid may impact the hydrolysis time. For a starting pH less than 7, the gel time may be less than 1 hour. Maintaining a starting pH of the spent drilling fluid between 8 and 11 enables control over the hydrolysis time. Control over the hydrolysis time allows the placement of the spent drilling fluid in the lost circulation zone before the gel pH is achieved as a result of acid generation from hydrolysis of the chemical activator. Controlling the pH may be achieved by varying the concentration of the chemical activator. As the chemical activator hydrolyzes and produces acid, the acid reduces the pH of the spent drilling fluid from the starting pH to the gel pH. Temperature, time of exposure between the chemical activator and the water in the spent drilling fluid, and the molecular weight of the chemical activator impacts the hydrolysis time.

The rate of the hydrolysis of the chemical activator is dependent on the temperature of the chemical activator. Specifically, as the temperature of the chemical activator increases the rate of hydrolysis and conversion to acid increases. As such, the downhole conditions and temperature at the lost circulation zone must be considered when determining a working time to position the spent drilling fluid at the lost circulation zone before generation of the LCM composition. In various embodiments, the hydrolysis time may be between 1 hour and 24 hours, 1 hour and 20 hours, 2 hours and 15 hours, or 3 hours and 10 hours. As the hydrolysis time is dependent on the temperature and pressure conditions experienced downhole, the hydrolysis time can be tuned to account for the wellbore conditions at the depth at which the lost circulation zone is located.

The gel time contributes to the working period to position the spent drilling fluid into the lost circulation zone after mixing of the chemical activator and the spent drilling fluid. Specifically, the working period to position the spent drilling fluid into the lost circulation zone may comprise the period while the pH of the spent drilling fluid is being reduced to the gel pH as well as the gel time representing the period between the gel pH being reached and formation of the LCM composition. In one or more embodiments, the gel time may range between 5 minutes and 24 hours. In various further embodiments, the gel time may range between 30 minutes and 20 hours, 1 hour and 18 hours, 2 hours and 15 hours, and 10 minutes to 10 hours. It will be appreciated that the gel time may be tuned to account for the wellbore conditions at the depth at which the lost circulation zone is located.

It will be appreciated that the downhole temperature may have an effect on the gel time of the alkaline nanosilica dispersion in the spent drilling fluid. Specifically, it is believed that as the surrounding temperature increases the gel time decreases. Further, it is believed that as the surrounding pressure increases the gel time decreases. Specifically, an electrical repulsion between the same charged particles stabilizes the alkaline nanosilica dispersion and avoids gel formation. Disturbance of the charge balance, by changing the pH for example, can cause the colloidal particles to aggregate and initiate formation of a gel. Increased pressure may increase the rate of aggregation of the silica particles resulting in a decrease in the gel time. As such, the temperature and pressure at the lost circulation zone must be accounted for when preparing the spent drilling fluid formulation and the volume of chemical activator to utilize.

Without being limited by theory, the LCM composition in its aggregated state is an irreversible solid gel. The solid gel LCM composition does not degrade under temperature, pressure or pH conditions once formed. Gel breakers do not break the LCM composition either. Accordingly and advantageously, the LCM composition may be used at elevated temperatures, such as those experienced in a wellbore and a subterranean formation.

As previously stated, the spent drilling fluid may further comprise one or more additives. The additives may comprise drilling fluid additives commonly used in drilling fluids, such as, but not limited to viscosifiers, pH control agents, weighting agents, filtration control additives, and combinations thereof.

In one or more embodiments, the additive may be an alkali metal silicate or alkaline earth metal silicate. The alkali metal silicates may comprise sodium silicate, potassium silicate, or both. The alkaline earth metal silicates may comprise magnesium silicate, calcium silicate, or both. It will be appreciated that the addition of alkaline earth metal silicates may increase the compressive strength of the loss circulation material composition. In various embodiments, the alkali metal silicate or alkaline earth metal silicate may be present in the spent drilling fluid at 1 to 40 wt. %.

Alternatively or additionally, the additive may be a urea-formaldehyde resin. The urea-formaldehyde resins may be present in powder or liquid form within the spent drilling fluid. It will be appreciated that the addition of urea-formaldehyde resins may increase the compressive strength of the loss circulation material. In various embodiments, the alkali metal silicate or alkaline earth metal silicate may be present in the spent drilling fluid at 1 to 40 wt. %.

As previously stated the spent drilling fluid may optionally comprise one or more alkaline compounds for pH adjustment, which may comprise lime (calcium hydroxide or calcium oxide), soda ash (sodium carbonate), sodium hydroxide (caustic soda), potassium hydroxide, or combinations thereof. It is noted that conjugate bases to acids with a pKa of more than about 13 are considered strong bases. The pH may be maintained within a range in order to minimize corrosion caused by the drilling fluid on steel tubulars, tanks, pumps, and other equipment contacting the drilling fluid as well as to maintain the pH greater than the gel pH prior to introduction of the chemical activator. Additionally, the alkaline compounds may react with gases, such as $CO_2$ or $H_2S$, encountered by the drilling fluid during drilling operations to prevent the gases from hydrolyzing one or more components of the drilling fluid. Some example spent drilling fluids may optionally comprise from 0.1 pounds per barrel (lb/bbl) to 10 lb/bbl of alkaline compounds. In some embodiments, the spent drilling fluids comprises from 0.1 lb/bbl to 10 lb/bbl of caustic soda, 0.1 lb/bbl to 1 lb/bbl of caustic soda, or 0.1 lb/bbl to 0.5 lb/bbl of caustic soda.

In embodiments, the spent drilling fluid may comprise a rheology modifier, for example, a viscosifier, to impart non-Newtonian fluid rheology to the spent drilling fluid to facilitate lifting and conveying rock cuttings to the surface of the wellbore and to suspend any weighting material. The viscosifiers may include, but are not limited to, xanthan gum polymer (XC polymer), bentonite, polyacrylamide, polyanionic cellulose, or combinations of these viscosifiers. In some embodiments, the spent drilling fluid may comprise xanthan gum polymer, which is a polysaccharide secreted by the bacteria *Xanthomonas Campestris* (XC). The spent drilling fluid may comprise from 0.1 lb/bbl to 101lb/bbl of XC polymer, from 0.5 lb/bbl to 5 lb/bbl of XC polymer, or from 1 lb/bbl to 3 lb/bbl of XC polymer. Additionally or alternatively, bentonite may be added to the spent drilling fluid in an amount of from 0.1 lb/bbl to 10 lb/bbl of bentonite, from 1 lb/bbl to 8 lb/bbl of bentonite, or from 3 lb/bbl to 5 lb/bbl of bentonite. Other suitable viscosifiers may be used in the spent drilling fluid without deviating from the scope of the present subject matter.

In one or more embodiments, filtration control additive may be added to the spent drilling fluid to reduce the amount of filtrate lost from the spent drilling fluid into a subsurface formation. The filtration control additives may comprise organophilic (for example, amine-treated) lignite, bentonite, manufactured polymers, biopolymers, natural polymers, thinners or deflocculants, or combinations thereof. In one or more embodiments, the filtration control additive may comprise a polyanionic celluclose, such as PAC-R™, which is commercially available from Halliburton Energy Services, Inc. The filtration control additive may also comprise a starch. The spent drilling fluid may comprise from 1 lb/bbl to 10 lb/bbl of filtration control additive, from 2 lb/bbl to 8 lb/bbl of filtration control additive, from 3 lb/bbl to 7 lb/bbl of filtration control additive, or from 4 lb/bbl to 5 lb/bbl of filtration control additive.

As previously stated, the additives may comprise a weighting material. The weighting material may have a density suited for raising the spent drilling fluid density. In some embodiments, the weighting material may be a particulate solid having a density sufficient to increase the density of the spent drilling fluid without adding excessive weighting material such that the spent drilling fluid cannot be circulated through the wellbore. The weighting material may have a density of from 2 grams per cubic centimeter (g/cm³) to 6 g/cm³. The weighting materials may comprise barite (minimum density of 4.20 g/cm³), hematite (minimum density of 5.05 g/cm³), calcium carbonate (minimum density of 2.7-2.8 g/cm³), siderite (minimum density of 3.8 g/cm³), ilmenite (minimum density of 4.6 g/cm³), or combinations thereof. It will be appreciated that the weight percent of the weighting material in the spent drilling fluid may be 0 to 99 wt. % based on the total weight of the spent drilling fluid to achieve an amount of weighting material sufficient to acquire a particular desired density.

In at least one embodiment of the method for controlling loss circulation, the spent drilling fluid may be utilized to drill a wellbore in a subterranean formation. When a lost circulation zone is encountered, the chemical activator may be mixed with the spent drilling fluid to create the spent drilling fluid. It will be appreciated that the chemical activator can be introduced into the spent drilling fluid while maintaining continuous flow of the spent drilling fluid. The amount of chemical activator introduced into the spent drilling fluid may be adjusted to achieve a desired hydrolysis time.

In one or more embodiments, the spent drilling fluid and the chemical activator are combined at the surface of the wellbore and provided downhole as a single LCM composition. Specifically, the chemical activator may be introduced into the spent drilling fluid to form the LCM composition prior to introduction into the wellbore. During passage from the surface to the lost circulation zone, the chemical activator undergoes the hydrolysis to form an acid and begins the process of converting the spent drilling fluid to the solid gel LCM composition. As the spent drilling fluid circulates through the wellbore and channels within the subterranean formation toward the lost circulation zone, the chemical activator hydrolyzes to produce the acid. The acid reduces the pH of the spent drilling fluid as the spent drilling fluid circulates to the lost circulation zone. In some embodiments, the pH of the spent drilling fluid is reduced to less than the gel pH prior to positioning in the lost circulation zone resulting in initial formation of the solid gel LCM composition. In further embodiments, the solid gel LCM composition may begin to form subsequent to positioning in the lost circulation zone as the pH of the spent drilling fluid is not reduced to less than the gel pH prior to positioning of the spent drilling fluid within the lost circulation zone. The LCM composition fills the lost circulation zone or passageways leading to the lost circulation zone to cease lost circulation and prevent further drainage of the microsilica drilling fluid.

In one or more embodiments, the spent drilling fluid and the chemical activator are provided downhole as separate process streams. Specifically, the chemical activator and the spent drilling fluid may be separately introduced into the wellbore, but combined to form the LCM composition prior to introduction into the lost circulation zone. Providing the spent drilling fluid and the chemical downhole as separate process streams may be achieved by pumping the spent drilling fluid through the annulus of the drill string while the chemical activator may be pumped through the drill pipe. It will be appreciated that the spent drilling fluid may instead be pumped through the drill pipe and the chemical activator may instead be pumped through the annulus. As such, conversion of the spent drilling fluid into the solid gel LCM composition may be initiated prior to introduction into the lost circulation zone. Similarly, to embodiments in which the LCM composition is formed prior to introduction into the wellbore, the spent drilling fluid can circulate through the wellbore and channels within the subterranean formation to the lost circulation zone positioned downstream of the mixing point of the spent drilling fluid and chemical activator. As the spent drilling fluid circulates through the wellbore and channels within the subterranean formation toward the lost circulation zone, the chemical activator hydrolyzes to produce the acid and reduce the pH of the spent drilling fluid. Providing the constituents of the LCM composition downhole separately allows for positioning at a closer position to the lost circulation zone before initiating the gelling process with hydrolysis of the chemical activator. As with embodiments in which the LCM composition is formed prior to introduction into the wellbore, the pH of the spent drilling fluid may reduced to less than the gel pH prior to positioning in the lost circulation zone or subsequent to positioning in the lost circulation zone. Upon formation, the solid gel LCM composition fills the lost circulation zone or passageways leading to the lost circulation zone to cease lost circulation and prevent further drainage of the drilling fluid.

The location of conversion to the LCM composition may be determined based on calculations involving the volume of the spent drilling fluid, the pump rate, and the distance between the lost circulation zone and the surface or mixing point of the spent drilling fluid and chemical activator. Further, it will be appreciated that when the spent drilling fluid reaches the lost circulation zone, circulation can be temporarily terminated so as to allow the LCM composition to gel in the lost circulation zone.

In one or more embodiments, when a lost circulation zone is encountered, a pill of the LCM composition may be produced by mixing the spent drilling fluid and the chemical activator. The introduction of the spent drilling fluid may be temporarily suspended with introduction of the LCM composition pill into the wellbore. The pill of the LCM composition may be allowed to migrate to the lost circulation zone. The pill of the LCM composition may be followed by a slug or pill of the spent drilling fluid or the drilling fluid. The volume of the pill of the LCM composition may be based on the size of the lost circulation zone. It will be appreciated that the size of the lost circulation zone may be estimated based on the volume of lost drilling fluid. Further, the amount of chemical activator may be based on the desired hydrolysis time. As the pill of the LCM composition migrates to the lost circulation zone, the chemical activator hydrolyzes to produce the acid and reduce the pH of the pill of the LCM composition. The solid gel LCM composition forms in the lost circulation zone when the pH of the pill of the LCM composition is less than the gel pH. The solid gel LCM composition then fills the lost circulation zone. Without being limited by theory, and advantageously, the chemical activator and the alkaline nanosilica dispersion may not precipitate from the spent drilling fluid generally or the aqueous solution specifically, which allows for the LCM composition to be introduced to the wellbore as a single pill.

In one or more embodiments, the chemical activator may be combined with the spent drilling fluid within the lost circulation zone. Upon encountering a lost circulation zone with the drilling fluid or the spent drilling fluid, the drilling fluid or the spent drilling fluid will naturally flood the lost circulation zone. A slug or pill of the chemical activator may be provided to the lost circulation zone to form the LCM composition within the lost circulation zone. It will be appreciated that when the slug or pill of the chemical activator reaches the lost circulation zone and mixes with the spent drilling fluid to form the LCM composition, drilling and introduction of further drilling fluid or further spent drilling fluid can be temporarily terminated so as to allow the LCM composition to gel in the lost circulation zone.

As previously stated, in subsequent casing and completion operations, the LCM composition may be sequestered in the lost circulation zone by cementing a portion of the wellbore overlapping with the lost circulation zone. Without being limited by theory, this may permit disposal of the spent drilling fluid in a manner not requiring expensive treatment operations. Particularly, in embodiments, the method may further comprise introducing a casing string into the wellbore. The casing string may comprise casing pipe. The casing string may additionally comprise, but may not be limited to, guide shoes, centralizers, float collars, top and bottom plugs, or combinations thereof. The various components of the casing string, except for the bottom plug, may each comprise an inner sidewall operable to transmit a fluid uphole to downhole through a cavity defined by the inner sidewalls. In embodiments comprising the casing string, the casing string and a wellbore wall of the wellbore may define an annular region between the casing string and the wellbore, such as the portion of the wellbore wall overlapping with the lost circulation zone plugged with the LCM composition.

Following the introduction of the casing string into the wellbore, a cementing fluid may be inserted into the annular region by pumping the cementing fluid into the cavity defined by the inner sidewalls of the casing string, to the bottom of the casing string, around the bottom of the casing string, into the annular region, or combinations thereof. The cementing fluid may be any cementing fluid understood in the art. Following the insertion of an appropriate amount of the cementing fluid into the inner cavity of the casing string, in embodiments, a displacement fluid may be utilized to push the cementing fluid out of the inner cavity of the casing string and into the annular region. The cementing fluid may then be cured or otherwise allowed to harden, thereby setting the casing string in place, and sequestering the LCM composition comprising the spent drilling fluid within the subterranean formation.

Examples

The various embodiments of the LCM compositions and methods employing the same according to the present embodiments herein will be further clarified by the following examples. The examples are illustrative in nature, and should not be understood to limit the subject matter of the present embodiments.

A spent drilling fluid was prepared according to embodiments herein. To prepare the aqueous drilling fluid, five pounds per barrel (lb/bbl) of bentonite was prehydrated in 245.62 lb/bbl water for 16 hours and then mixed for 20 minutes (min). NaCl, $CaCl_2$ and drilled solids were then added at the amounts below to show increase salinity and solids, respectively of a spent drilling fluid. Additives were then added to the spent drilling fluid according to the amounts shown in Table 1 below.

TABLE 2

| Recipe for Solid Gel LCM composition | | |
| --- | --- | --- |
| Additive | Mixing time (minutes) | Amount (lbs/bbl) |
| Water | | 245.62 |
| Bentonite | 20 | 5 |
| XC polymer | 5 | 0.5 |

TABLE 2-continued

| Recipe for Solid Gel LCM composition | | |
| --- | --- | --- |
| Additive | Mixing time (minutes) | Amount (lbs/bbl) |
| PACR | 5 | 0.5 |
| NaCl | 5 | 50 |
| CaCl2 | | 90 |
| Drill Solids | 5 | 60 |
| Caustic soda | 5 | 0.5 |
| Barite | 5 | 47.8 |

Figure 2:
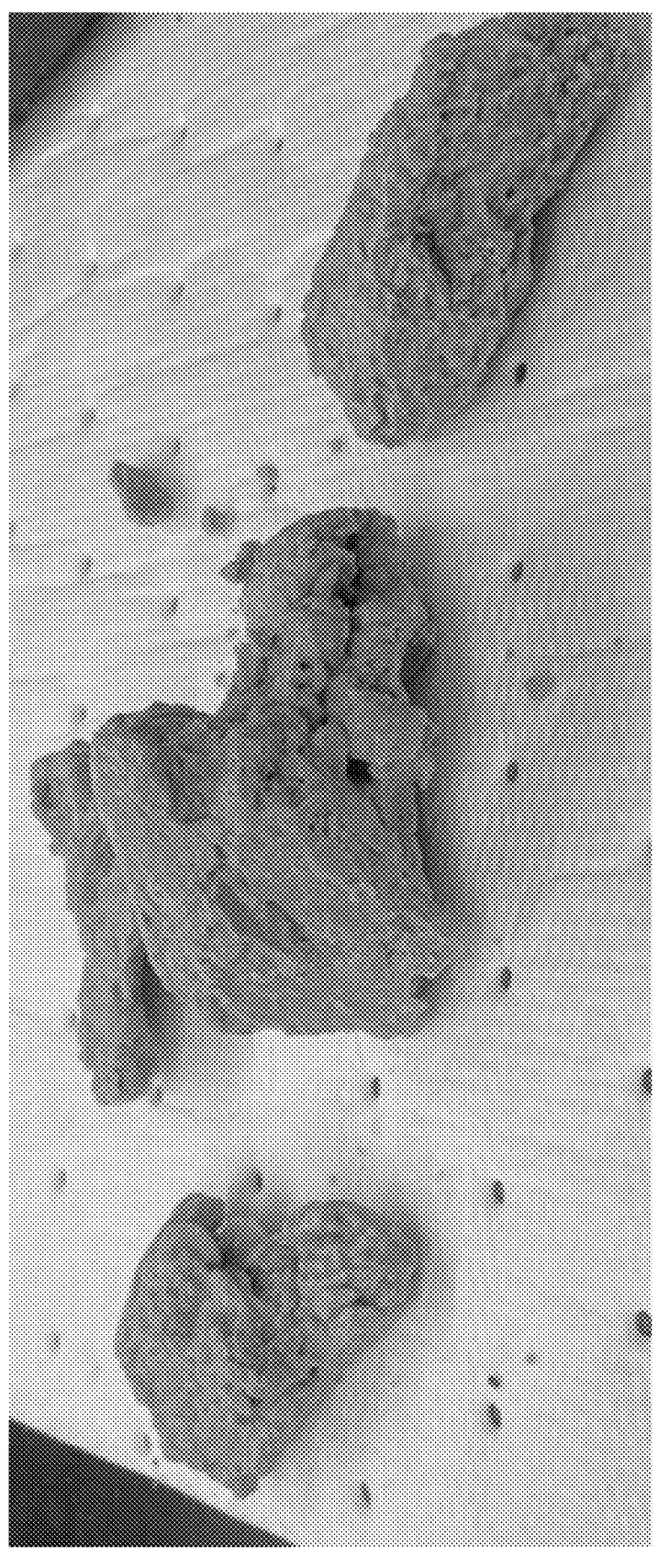
FIG. 2 illustrates another lost circulation material composition in a gelled state, according to one or more embodiments described herein.

Particularly, 175 mL of alkaline nanosilica dispersion (2:1 ratio of drilling fluid to alkaline nanosilica) and 5 grams of ethyl lactate as chemical activator were added to the spent drilling fluid and mixed for 5 minutes using a multimixer. The LCM composition was then statically aged in a vertical position at 250° F. (121.11° C.) and 500 pounds per square inch (psi) pressure for 16 hours. After 16 hours of static aging, the LCM composition was converted to the solid gel LCM as shown in FIGS. 1 and 2.

For purposes of preparing the solid gel LCM of Table 1, the alkaline nanosilica dispersion was obtained commercially as IDISIL® SI 4545 from Evonik Industries (Essen, Germany); the properties of which are set forth in Table 2. The PAC-R™ was obtained commercially from Halliburton (Houston, Texas) as a filtration additive.

TABLE 2

| Properties of alkaline nanosilica dispersion | |
| --- | --- |
| Property | Value |
| Particle size - Titrated (nm) | 45 |
| Percent (%) $SiO_2$ | 45 |
| pH @ 25 degrees Celsius (° C.) | 9-11 |
| Density (g/cm³) | 1.32 |
| Viscosity @ 25° C. (centipoise (cP)) | — |
| Visual Appearance | white/off-white |

Having described the subject matter of the present embodiments herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present embodiments including, but not limited to, embodiments defined in the appended claims. More specifically, although some aspects of the present embodiments are identified herein as preferred or particularly advantageous, it is contemplated that the present embodiments is not necessarily limited to these aspects.

It is also noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." It is noted that the use of the term "having" or its equivalents in this disclosure should also be interpreted in like manner as the more commonly used open-ended preamble term "comprising". Similarly, it is noted that the use of the term "including" or its equivalents in this disclosure should also be interpreted in like manner as the more commonly used open-ended preamble term "comprising".

What is claimed is:

1. A lost circulation material (LCM) composition comprising:
  a spent drilling fluid comprising
    an aqueous solution,
    contaminants comprising heavy metals, salts, or both, wherein:
      the heavy metals comprise ions of chromium, manganese, iron, cobalt, nickel, copper, zinc, arsenic, cadmium, barium, mercury, lead, thorium, uranium, or combinations thereof; and
      the spent drilling fluid has a salinity of greater than or equal to 500,000 ppm, a heavy metals content of greater than or equal to 0.001 ppm, or both, and
    an alkaline nanosilica dispersion, wherein the spent drilling fluid has a pH and a gel pH, and the pH of the spent drilling fluid is greater than the gel pH; and
  a chemical activator comprising a water soluble hydrolysable ester.

2. The LCM composition of claim 1, wherein the water soluble hydrolysable ester comprises glycol ester, polyethylene glycol ester, an alkyl ester, or an ester of a carboxylic acid and an alcohol.

3. The LCM composition of claim 1, wherein the spent drilling fluid has:
  a pH of from 8 to 11; and
  a gel pH of greater than 3 to less than 8.

4. The LCM composition of claim 1, wherein the spent drilling fluid further comprises an additive comprising a viscosifier, a pH control agent, a weighting agent, a filtration control additive, or combinations thereof.

5. The LCM composition of claim 1, wherein a volume ratio of the chemical activator to the spent drilling fluid is from 1:1000 to 1:10.

6. The LCM composition of claim 1, wherein:
  the spent drilling fluid has a salinity of greater than or equal to 500,000 ppm; and
  the salts comprise sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations thereof.

7. The LCM composition of claim 1, wherein:
  the contaminants comprise heavy metals, the heavy metals comprising ions of arsenic, cobalt, mercury, lead, cadmium, thorium, uranium, or combinations thereof; and
  the spent drilling fluid has a heavy metals content of greater than or equal to 0.001 ppm.

8. The LCM composition of claim 1, wherein:
  the contaminants comprise heavy metals, the heavy metals comprising ions of chromium, manganese, iron, nickel, copper, zinc, barium, or combinations thereof; and
  the spent drilling fluid has a heavy metals content of greater than or equal to 0.05 ppm.

9. A method for controlling lost circulation, the method comprising:
  introducing a spent drilling fluid comprising an aqueous solution, contaminants comprising salt, heavy metals, or both, and an alkaline nanosilica dispersion into a wellbore;
  introducing a chemical activator to the spent drilling fluid, the chemical activator comprising a water soluble hydrolysable ester; and
  allowing the chemical activator to hydrolyze and produce an acid, reducing a pH of the spent drilling fluid to less than a gel pH and converting the spent drilling fluid into a lost circulation material (LCM) composition, and wherein:
    the heavy metals comprise ions of chromium, manganese, iron, cobalt, nickel, copper, zinc, arsenic, cadmium, barium, mercury, lead, thorium, uranium, or combinations thereof, and
    the spent drilling fluid has a salinity of greater than or equal to 500,000 ppm, a heavy metals content of greater than or equal to 0.001 ppm, or both.

10. The method of claim 9, further comprising injecting the spent drilling fluid or the LCM composition into the lost circulation zone within the wellbore.

11. The method of claim 10, further comprising:
  introducing a casing string into the wellbore, wherein the casing string comprises casing pipe and the casing string and a wellbore wall of the wellbore define an annular region between the casing string and the wellbore wall; and
  cementing at least a portion of the wellbore wall overlapping with the lost circulation zone with a cementing fluid, thereby sequestering the LCM composition in the lost circulation zone.

12. The method of claim 10, further comprising, prior to introducing the spent drilling fluid into the wellbore, drilling a wellbore with a drilling fluid until a lost circulation zone is observed, wherein the lost circulation zone is indicated by observing that a returning flow rate of the drilling fluid is less than an injection flow rate of the drilling fluid.

13. The method of claim 12, wherein the chemical activator is introduced to the spent drilling fluid prior to introduction into the wellbore, concurrently with introduction into the wellbore, concurrently with injection into the lost circulation zone, after injection into the lost circulation zone, or combinations thereof.

14. The method of claim 9, wherein the water soluble hydrolysable ester comprises glycol ester, polyethylene glycol ester, an alkyl ester, or an ester of a carboxylic acid and an alcohol.

15. The method of claim 9, wherein the spent drilling fluid has:
  a pH of from 8 to 11; and
  a gel pH of greater than 3 to less than 8.

16. The method of claim 9, wherein the spent drilling fluid further comprises an additive comprising a viscosifier, a pH control agent, a weighting agent, a filtration control additive, or combinations thereof.

17. The method of claim 9, wherein an amount of the chemical activator introduced to the spent drilling fluid is operable to maintain a volume ratio of the chemical activator to the spent drilling fluid of between 1:1000 to 1:10.

18. The LCM composition of claim 1, wherein the spent drilling fluid has a heavy metals content of greater than or equal to 0.001 ppm.

19. The method of claim 9, wherein:

the spent drilling fluid has a salinity of greater than or equal to 500,000 ppm; and the salts comprise sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations thereof.

20. The method of claim 9, wherein the spent drilling fluid has a heavy metals content of greater than or equal to 0.001 ppm.

* * * * *